(12) United States Patent
Diethorn

(10) Patent No.: US 8,160,234 B2
(45) Date of Patent: Apr. 17, 2012

(54) ASSIGNMENT OF CALL-CENTER AGENTS TO INCOMING CALLS

(75) Inventor: Eric John Diethorn, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1017 days.

(21) Appl. No.: 12/115,208

(22) Filed: May 5, 2008

(65) Prior Publication Data

US 2009/0274292 A1 Nov. 5, 2009

(51) Int. Cl.
*H04M 5/00* (2006.01)

(52) U.S. Cl. ......... 379/265.11; 379/221.01; 379/221.14; 379/272; 379/273; 379/142.07

(58) Field of Classification Search ............ 379/265.02, 379/265.06, 265.11, 265.12; 455/67.13, 455/560; 381/71.6, 72, 74
See application file for complete search history.

(56) References Cited

U.S. PATENT DOCUMENTS

| | | | |
|---|---|---|---|
| 4,852,144 A * | 7/1989 | Cole | 379/11 |
| 5,712,954 A | 1/1998 | Dezonno | |
| 7,151,769 B2 * | 12/2006 | Stanforth et al. | 370/351 |
| 7,860,053 B1 * | 12/2010 | Ho | 370/329 |
| 7,940,897 B2 * | 5/2011 | Khor et al. | 379/88.02 |
| 2003/0186654 A1 * | 10/2003 | Shigemura et al. | 455/67.13 |
| 2006/0126529 A1 * | 6/2006 | Hardy | 370/252 |
| 2006/0221876 A1 * | 10/2006 | Kosanovic et al. | 370/286 |
| 2007/0237336 A1 | 10/2007 | Diethorn | |
| 2008/0118042 A1 * | 5/2008 | Hogg | 379/93.03 |
| 2008/0152094 A1 * | 6/2008 | Perlmutter | 379/88.01 |

OTHER PUBLICATIONS

Morris, Euros, "GB Application No. 0822858.7 Search Report", Mar. 23, 2009, Publisher: UK IPO, Published in: GB.

* cited by examiner

*Primary Examiner* — Joseph J Nguyen

(57) ABSTRACT

A technique is disclosed that optimizes the background noise experienced by a party who is calling into a call center. Working as part of an overall call-assignment algorithm, the technique considers the acoustic noise that is present in the vicinities of multiple call-center agents who are otherwise satisfactory candidates to handle a call. The technique then selects an agent to handle the call who is associated with an optimal acoustic noise. Typically, the selected agent is associated with lowest background noise level. The background noise is monitored at each call agent's station by evaluating the signals that are present at the agent's microphone. Usually, this is done when a call agent is between calls and, as a result, is not using her headset at that moment. In other words, the background noise is actually measured, and the measurements are then used to assign a call agent to the incoming call.

18 Claims, 4 Drawing Sheets

ASSIGNMENT OF CALL-CENTER AGENTS TO INCOMING CALLS

FIELD OF THE INVENTION

The present invention relates to telecommunications in general, and, more particularly, to assigning call-center agents to incoming calls.

BACKGROUND OF THE INVENTION

A call center is a specialized central office that is used to handle a large number of incoming calls, or outgoing calls, for a particular purpose. For example, a call center can be used by a company to provide incoming product support to customers or information requests from customers.

The party who is calling into the call center, also known as "the calling party," typically places a call to a general support number, upon which the call is then assigned a particular call agent based on a variety of well-understood factors. For example, the call can be assigned an agent based on the calling party's particular need for assistance, the agent's expertise, and/or the availability of call agents to handle an incoming call at any particular moment.

A call center often has a large, open workspace to physically accommodate all of the call agents who handle the calls. In order to accommodate a maximum number of call agents, the workspace is typically divided into multiple clusters of workstation areas. Each workstation area accommodates an agent and typically comprises a computer, a telephone, a desk, and a chair within a cubicle or otherwise-partitioned station.

As long as the call center is handling call traffic, in which each agent engaged in a call is speaking at least part of the time, there is an ever-present level of acoustic noise in the background. This is affected by the dimensions of the workspace, the acoustic properties of the workstation areas, and how the call agents are situated relative to one another.

SUMMARY OF THE INVENTION

When assigning a call agent to an incoming call, one factor that has not been previously considered, in at least in some techniques in the prior art, is the background acoustic noise that is present at the call center. Consequently, it is often the case that when a calling party is connected to an agent, the background acoustic noise in the vicinity of the agent and her workstation area can be moderate to high. In particular, the calling party is often able to hear the muffled voices of other call agents who are near the assigned call agent. Although the background noise that is present on a call might not typically be disruptive to the calling party, it can affect the calling party's experience while on the call. And in a time when many callers regard call centers with disdain, having additional control of the caller's experience can only help. More serious, perhaps, is the possibility of the calling party overhearing private information, such as social security numbers, uttered by agents other than that agent attending to the calling party.

The present invention enables the reduction of the background noise experienced by the calling party by considering the acoustic noise that is present at the call center. In particular, working as part of an overall call-assignment algorithm, the technique of the illustrative embodiment considers the acoustic noise that is present in the vicinities of multiple call agents who are otherwise satisfactory candidates to handle a call. The technique then selects an agent associated with an optimal acoustic noise to handle the call. While "optimal" can be defined in many ways, typically, the selected agent is associated with lowest background noise level.

In accordance with the illustrative embodiment of the present invention, the background noise is monitored at each call agent's station by evaluating the signals that are present at the agent's microphone. Usually, this is done when the call agent is between calls and, as a result, is not using her headset at that moment. In other words, the background noise is actually measured, and the measurements are then used to assign a call agent to the incoming call.

In some alternative embodiments, the acoustic noise can be inferred rather than, or in addition to, being measured. Because first-order background noise is inversely proportional to the distance between agents in the workspace, one can roughly visualize the effect of assigning calls in this way as an assignment of calls based on the spatial relationship of the call agents with respect to one another. For example, if two call agents are available to handle an incoming call, the technique of inferring the acoustic noise would tend to assign, to the incoming call, the call agent of the two who is the furthest away from a third agent already engaged in a call.

Yet another embodiment of the present invention can be applied when there is only one available agent to handle a new incoming call at a particular moment. At that point, the call assignment algorithm could predict whether a second agent will become available within a reasonably short amount of time, such as within a minute. If so, the call assignment algorithm does not immediately reassign the one available agent, and when the second agent becomes available, the algorithm then has two available agents from which to select based on the differences in acoustic noise.

In yet other alternative embodiments, the same mechanisms used to monitor the acoustic background noise can be exploited in order to increase the level of background noise heard by the calling party. In some situations, increased levels of neighboring call-agent speech can create an aura of excitement with the calling party—a sales "buzz"—which can result in increased sales. Knowing the current acoustic noise level in the agent's environment, the noise level in a given agent's transmitted speech path can be increased either actually, by de-idling inactive call agents within first agent's vicinity, or artificially by synthetically adding prerecorded call-floor noise to the agent's transmitted speech waveform.

The illustrative embodiment of the present invention comprises: receiving an incoming call at a data-processing system; identifying a plurality of call agents who are available to handle the incoming call; determining the acoustic noise that is present in the vicinity of each call agent in the plurality; and assigning a call agent in the plurality to the incoming call, based on the acoustic noise.

DETAILED DESCRIPTION

The following term is defined for use in this Specification, including the appended claims:

The term "call," and its inflected forms, is defined as an interactive communication involving one or more telecommunications terminal (e.g., "phone", etc.) users, who are also known as "parties" to the call. An audio call is featured in the illustrative embodiment of the present invention, in which audio signals originated by at least one of the call parties is transmitted to another call party. As those who are skilled in the art will appreciate, in some alternative embodiments, a call might comprise video signals. Furthermore, a call can involve one or more human call parties or one or more automated devices, alone or in combination with each other.

Figure 1:
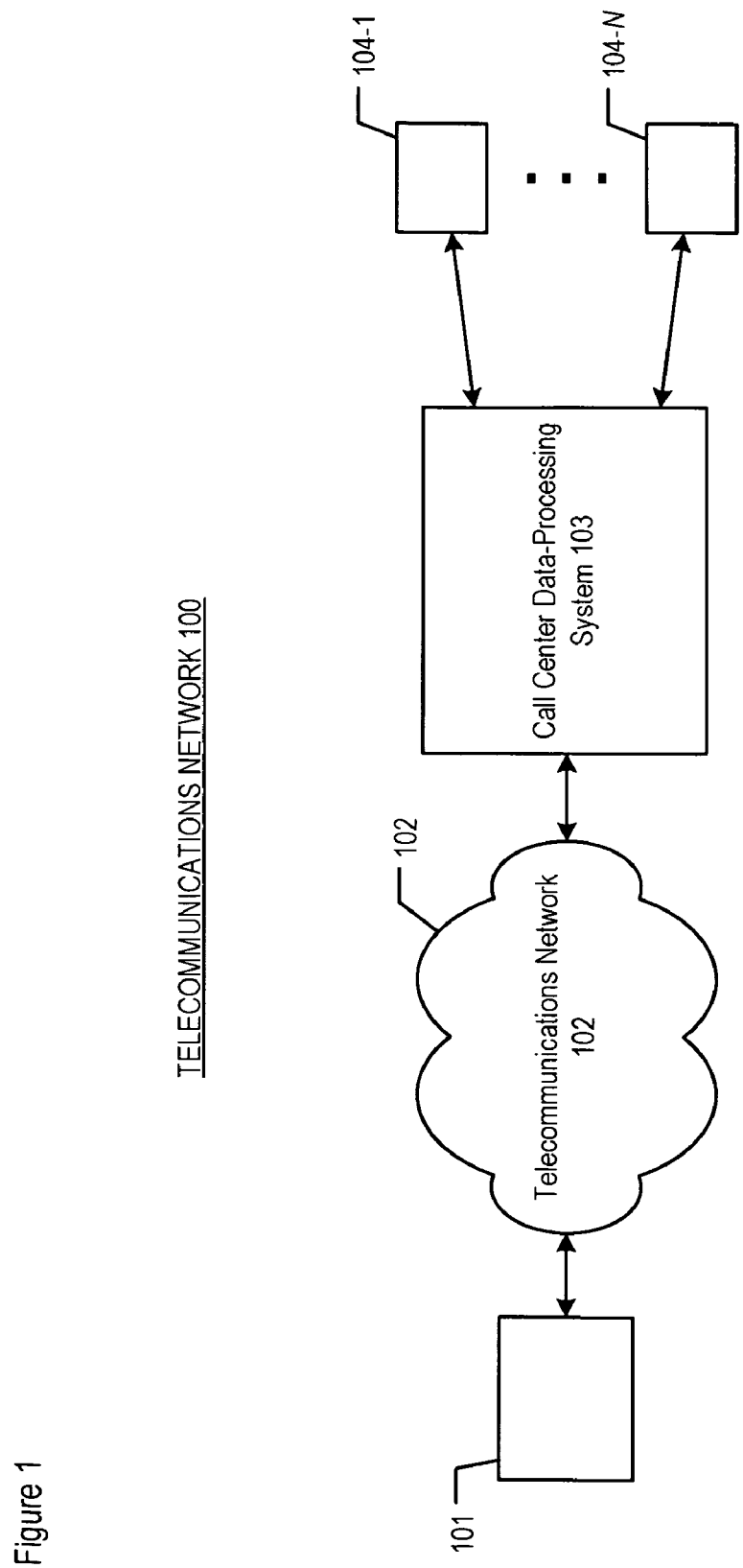
FIG. 1 depicts telecommunications system 100, which features call-center data-processing system 103, in accordance with the illustrative embodiment of the present invention.

FIG. 1 depicts telecommunications system 100, which features a "call center," in accordance with the illustrative embodiment of the present invention. A call center is sometimes referred to as a "contact center." Telecommunications system 100 comprises calling telecommunications terminal 101; telecommunications network 102; call center data-processing system 103; and enterprise telecommunications terminals 104-1 through 104-N, wherein N is a positive integer, the depicted elements being interconnected as shown.

Calling telecommunications terminal 101 is a device that is capable of originating or receiving calls, or both. For example, terminal 101 can be one of a telephone, a notebook computer, a personal digital assistant (PDA), and so forth.

Terminal 101 handles calls via telecommunications network 102 and is capable of exchanging audio and call processing-related signals with one or more other devices, such as terminal 104-$n$ through data-processing system 103. To this end, terminal 101 exchanges one or more of Internet Protocol (IP) data packets, Session Initiation Protocol (SIP) messages, Voice over IP (VoIP) traffic, and stream-related messages (e.g., Real Time Streaming Protocol [RTSP] messages, etc.) with network 102, as well as system 103 and terminal 104-$n$.

Telecommunications network 102 is a network such as the Public Switched Telephone Network [PSTN], the Internet, etc. that carries calls to and from telecommunications terminal 101, call center data-processing system 103, and other devices not appearing in FIG. 1. A call might be a conventional voice telephony call, a video-based call, a text-based instant messaging (IM) session, a Voice over Internet Protocol (VoIP) call, and so forth.

Call center data-processing system 103 provides the functionality of a private-branch exchange with an automatic call distributor (ACD), in that it receives incoming calls from telecommunications network 102 and directs the calls to one of a plurality of telecommunications terminals within the enterprise (i.e., enterprise terminals 104-1 through 104-N) or to another function such as interactive voice response (IVR), depending on how system 103 is programmed or configured. For example, in an enterprise call center, system 103 might comprise logic for routing calls to call agents' terminals based on criteria such as how busy various call agents have been in a recent time interval, the telephone number called, and so forth.

In handling incoming calls, system 103 is capable of exchanging Internet Protocol (IP) data packets, Session Initiation Protocol (SIP) messages, Voice over IP (VoIP) traffic, and stream-related messages (e.g., Real Time Streaming Protocol [RTSP] messages, etc.) with calling terminals such as terminal 101 and enterprise terminals 104-1 through 104-N.

In some embodiments, system 103 might be programmed or configured so that an incoming call is initially routed to an IVR function, and, based on caller input, is subsequently redirected back to the private-branch exchange function of system 103 for routing to an appropriate telecommunications terminal within the enterprise (i.e., one of terminals 104-1 through 104-N). Possibly, system 103 might queue each incoming call if all agents are busy, until the queued call can be routed to an available agent at one of enterprise terminals 104-1 through 104-N. System 103 also receives audio signals from enterprise terminals 104-1 through 104-N, and transmits the audio signals on to telecommunications network 102 for delivery to a caller's terminal.

The salient components of system 103 that enable communication between a calling terminal (e.g., terminal 101, etc.) and enterprise terminal 104-$n$ are described below and with respect to FIG. 2. System 103 also performs the tasks of the illustrative embodiment, the salient tasks being described below and with respect to FIG. 3.

Enterprise telecommunications terminal 104-$n$, where n has a value between 1 and N, is a device that is capable of originating or receiving calls, or both. In accordance with the illustrative embodiment, terminal 104-$n$ is a workstation softphone at a call center; in some alternative embodiments, however, terminal 104-$n$ can be one of a telephone, a notebook computer, a personal digital assistant (PDA), and so forth. As those who are skilled in the art will appreciate, terminals 104-1 through 104-N can be different from one another.

Terminal 104-$n$ handles calls via system 103 and is capable of exchanging audio and call processing-related signals with one or more other devices, such as terminal 101 via network 102. To this end, terminal 104-$n$ exchanges one or more of Internet Protocol (IP) data packets, Session Initiation Protocol (SIP) messages, Voice over IP (VoIP) traffic, and stream-related messages (e.g., Real Time Streaming Protocol [RTSP] messages, etc.) with system 103.

As will be appreciated by those skilled in the art, some embodiments of the present invention might feature an architecture for telecommunications system 100 that is different than that of the illustrative embodiment. For example, in some embodiments, the interactive voice response (IVR) system functionality of system 103 might be provided by a separate server. In some other embodiments, the IVR functionality might not even be present. It will be clear to those skilled in the art, after reading this specification, how to make and use such alternative architectures.

Figure 2:
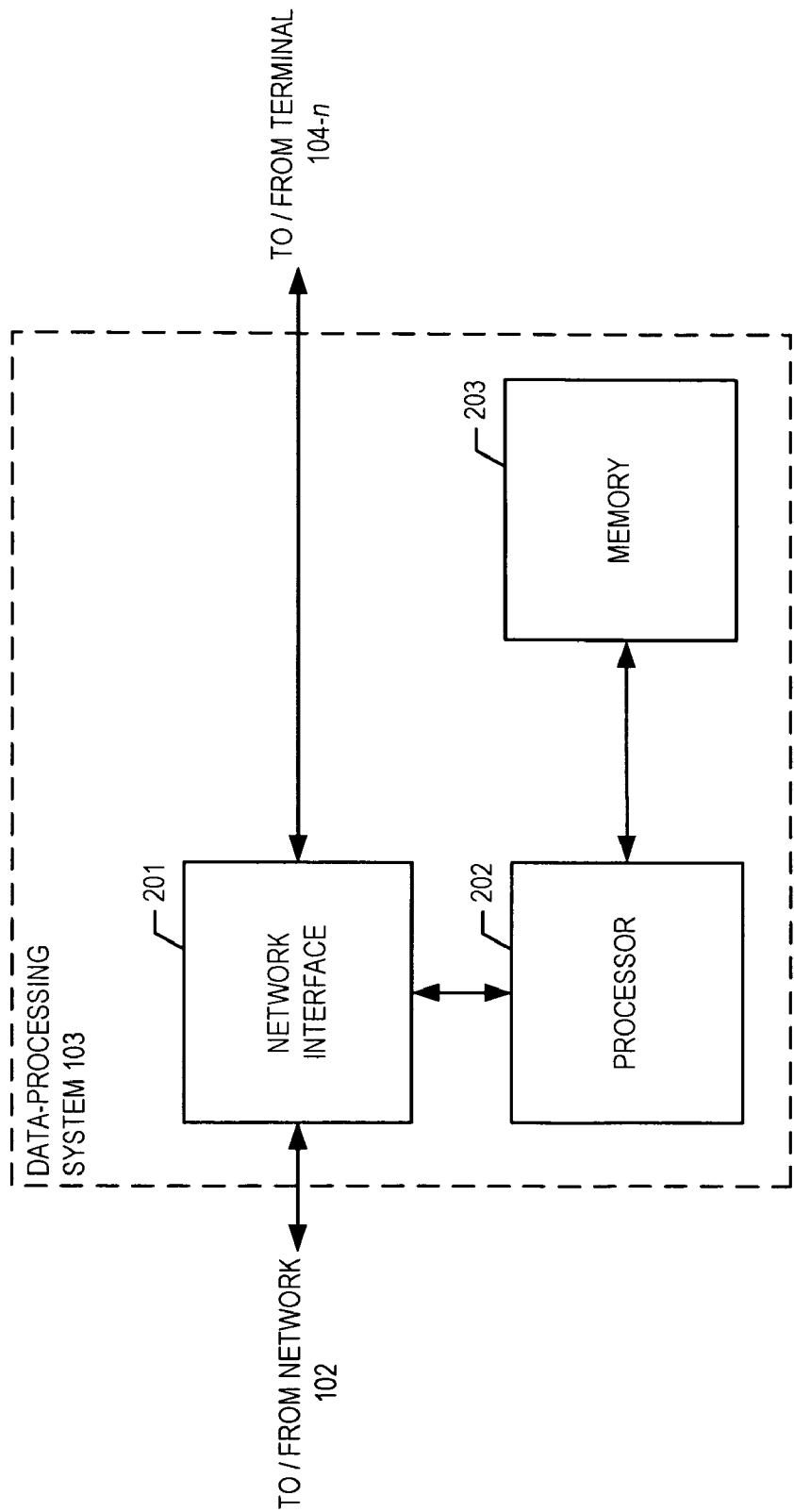
FIG. 2 depicts the salient components of call-center data-processing system 103.

FIG. 2 depicts the salient components of data-processing system 103, in accordance with the illustrative embodiment of the present invention. System 103 comprises network interface 201, processor 202, and memory 203, interconnected as shown. It will be clear to those skilled in the art, after reading this disclosure, how to make and use alternative embodiments of the present invention in which system 103 comprises any subcombination of the components listed above.

Network interface 201 comprises the circuitry that enables system 103 to receive signals from and transmit signals to any terminal such as terminals 101 (via network 102) and 104-$n$ in well-known fashion.

Processor 202 is a general-purpose processor that is capable of receiving information from and transmitting information to network interface 201, of executing instructions stored in memory 203 including those that correspond to the tasks of the illustrative embodiment, and of reading data from and writing data into memory 203. In some alternative embodiments of the present invention, processor 202 might be a special-purpose processor.

Memory 203 stores the instructions and data used by processor 202, in well-known fashion. Memory 203 can be any combination of dynamic random-access memory (RAM), flash memory, disk drive memory, and so forth.

Figure 3:
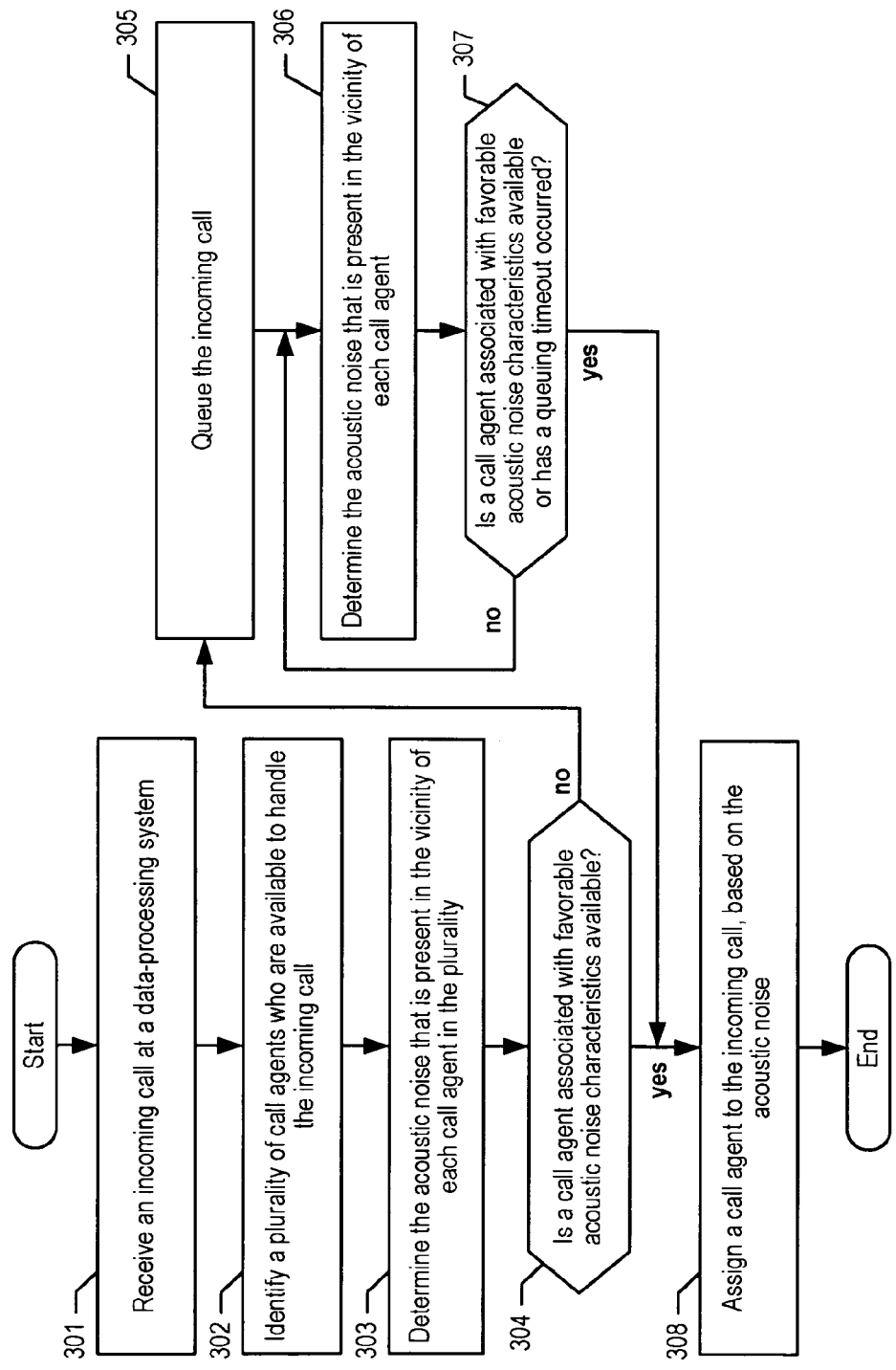
FIG. 3 depicts a flowchart of the salient tasks performed by call center data-processing system 103, in accordance with the illustrative embodiment of the present invention.

FIG. 3 depicts a flowchart of the salient tasks performed by call center data-processing system 103, in accordance with the illustrative embodiment of the present invention. As those who are skilled in the art will appreciate, some or all of the tasks depicted in FIG. 3 can be performed simultaneously or in a different order than that depicted.

In accordance with the illustrative embodiment, call center data-processing system 103 performs the depicted tasks, which are described below. However, it will be clear to those skilled in the art, after reading this specification, how to make and use alternative embodiments of the present invention, in which a data-processing system other than system 103 performs some or all of the described tasks, such as a separate automatic call distributor (ACD) system.

Figure 4:
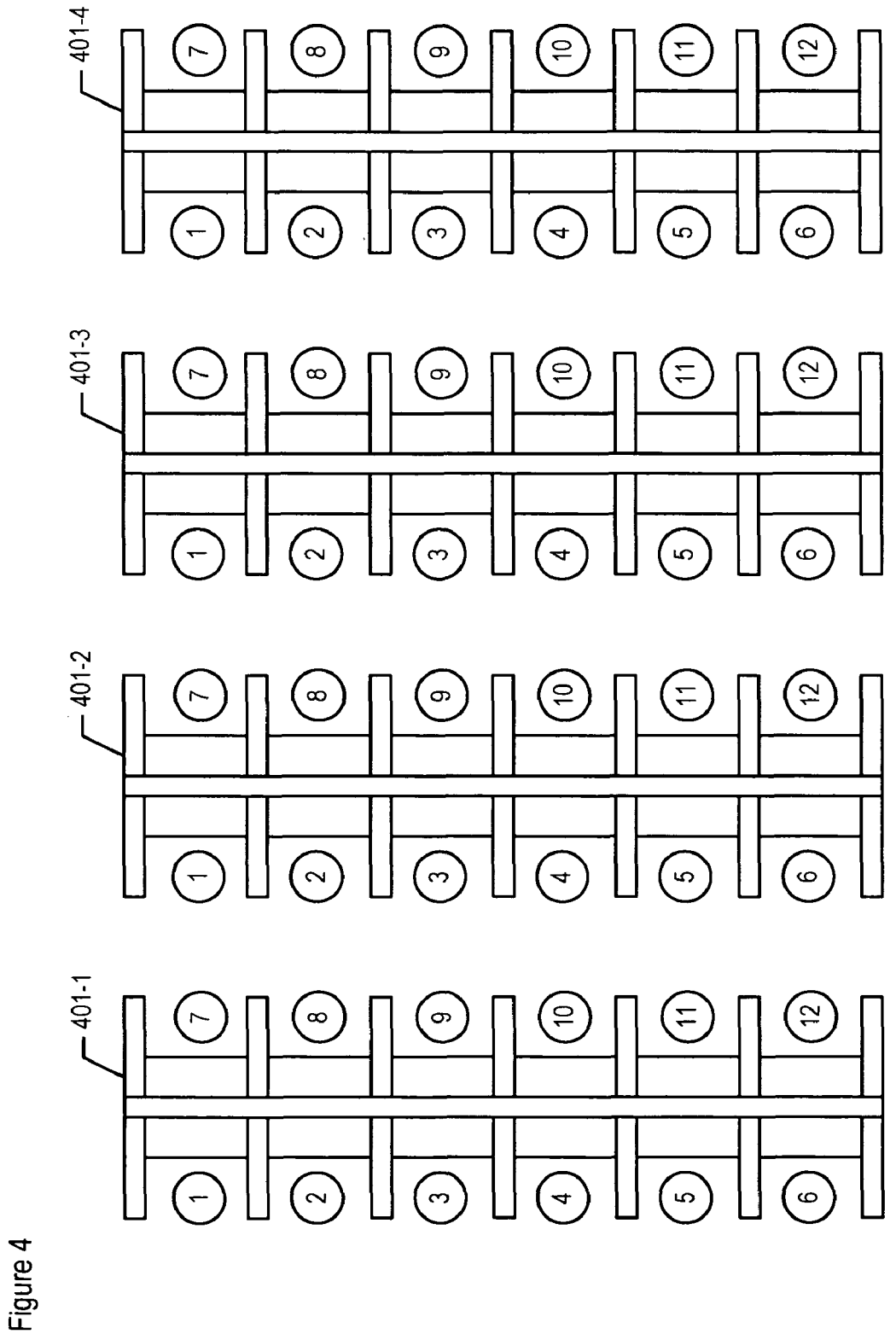
FIG. 4 depicts an overhead view of call center 400 supported by system 103, in which call agents are stationed in a workspace at various locations relative to one another.

In order to understand the salient tasks of the illustrative embodiment, it is important to understand the spatial relationship among call agents in determining how to assign a call agent to each incoming call. FIG. 4 depicts an overhead view of call center 400, in which call agents are stationed at various locations relative to one another. In the illustrative call-center layout that is depicted, there are four clusters of workstation areas, clusters 401-1 through 401-4. Each of enterprise terminals 104-1 through 104-N is associated with a different call agent who is located at a different workstation area, as depicted in FIG. 4. For example, agent 1 of a given cluster sits at the position at the upper left-hand corner of the cluster, agent 2 sits next to agent 1, and so on, while agent 7 (of a twelve-agent cluster) sits in front of agent 1, agent 8 sits in front of agent 2, and so on.

Across clusters, agent 7 of a first cluster (e.g., cluster 401-1) sits directly behind agent 1 of a second, adjacent cluster (e.g., cluster 401-2); agent 8 of the first cluster sits directly behind agent 2 of the second cluster; and so forth.

Although four elongated clusters of workstation areas are depicted, it will be clear to those skilled in the art how to make and use alternative embodiments of the present invention, in which a different number of clusters, a different number of workstation areas in each cluster, a different physical arrangement within a cluster (e.g., circular orientation, etc.), or a different combination of clusters applies.

The call agents that are located at call center 400 are continually receiving incoming telephone calls from calling terminals such as terminal 101. As a result, acoustic noise is present at one or more workstation areas throughout call center 400. Depending on various factors, the acoustic noise will vary across time and space. Such factors include the acoustics present at call center 400, the speech characteristics of the call agents, and how incoming calls are assigned to call agents. Although call-center acoustics and agents' speech characteristics might be changeable to some extent, the illustrative embodiment of the present invention concerns the assignment of call agents to the incoming calls, and in particular, in respect of the acoustic noise present throughout the call center.

At task 301, system 103 receives an incoming call from calling terminal 101. As those who are skilled in the art will appreciate, system 103 is capable of continually receiving incoming calls from other calling terminals as well.

At task 302, system 103 identifies a plurality of call agents who are available to handle the incoming call from calling terminal 101. In some embodiments, the call agents that are included in the plurality are not those who are merely available, but are those agents who are the best available agents to respond to the given incoming call. To determine the best agent or agents, system 103 can retrieve and review additional data (e.g., via the interactive voice response function, the caller's caller ID, etc.) to find out the reason for the call.

In some embodiments, the plurality of call agents identified by system 103 also includes one or more call agents who are presently unavailable but who will become available within a predetermined time interval. As those who are skilled in the art will appreciate, techniques exist for determining when an unavailable call agent will become available for an incoming call. The unavailable agents who are included in the plurality might include those agents who previously have been associated with a favorable level of acoustic noise, or who might be associated with a favorable level pending a measurement.

At task 303, system 103 determines the acoustic noise that is present in the vicinity of each call agent in the plurality. As those who are skilled in the art will appreciate, after reading this specification, various methods can be used for determining the acoustic noise, either individually or in combination with one another. For example, in a first method of determining the acoustic noise present, system 103 measures acoustic noise that is present at one or more workstation areas. System 103 can direct the telephone and/or the computer within each workstation area to activate its microphone, listen for acoustic signals when the associated call agent is idle, and report one or more measurements back to system 103.

In some embodiments of the first method, system 103 accumulates multiple measurements of acoustic noise, wherein at least one of the multiple measurements was made prior to receiving the incoming call.

As another example, in a second method of determining the acoustic noise present, system 103 infers a level of acoustic noise from the location of each available call agent relative to the locations of other call agents who are presently engaged in calls. In this example, if several call agents are available to handle an incoming call, namely agents at clusters 401-1 and 401-2 in FIG. 4, and most of the agents already engaged in calls are sitting at clusters 401-3 and 401-4, then the method of inferring the acoustic noise would tend to assign, to the incoming call, one of the agents sitting at the left side of cluster 401-1 (i.e., one of the agents furthest away from the agents already engaged in calls).

At task 304, if an acceptable candidate call agent with favorable acoustic noise characteristics is available to handle the incoming call, task execution proceeds to task 308. Otherwise, task execution proceeds to task 305.

In some embodiments, the assigning described below and with respect to task 308 will occur when the acoustic noise is less than a first, predetermined threshold, while in some alternative embodiments, the assigning will occur when the acoustic noise is greater than a second, predetermined threshold.

The first and/or second predetermined threshold, as well as the decision to select an agent with a lower or a high background noise level, can be based on one or more attributes of the incoming call. For example, if the purpose of the incoming call is to obtain technical support, then a minimal amount of background noise is probably desired. In some embodiments, the call agent candidate who is associated with the least amount of acoustic noise can be selected. In contrast, if the purpose of the incoming call is to pledge money for a telethon, then an increased noise level might be desired to create a sales "buzz" on the caller's part.

At task 305, if no agent who is associated with a favorable noise level is available, system 103 queues the incoming call in order for the incoming call to be assigned a call agent at a future time.

At task 306, in order to update the acoustic noise data, system 103 determines the acoustic noise that is present in the vicinity of each available (or soon-to-be-available) call agent, as performed at task 303.

At task 307, if an agent with favorable acoustic noise characteristics becomes available to handle the incoming call or if the predetermined time interval lapses, task execution proceeds to task 308. Otherwise, task execution proceeds to task 306.

At task 308, system 103 assigns a call agent to the incoming call. In accordance with the illustrative embodiment, the assignment is based on the acoustic noise, in particular on an available call agent being associated with favorable acoustic noise, as described earlier.

System 103 performs the tasks described with respect to FIG. 3 on additional, incoming calls as they arrive at the call center.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving an incoming call at a data-processing system;
   identifying a plurality of call agents who are available to handle the incoming call;
   determining a respective acoustic noise in a vicinity of each call agent in the plurality of call agents by inferring the respective acoustic noise based on a location distance of each call agent relative to other call agents presently engaged in calls; and
   assigning, based on the respective acoustic noise, a call agent in the plurality of the call to handle the incoming call.

2. The method of claim 1 wherein the determining of the acoustic noise comprises measuring acoustic noise after receiving the incoming call.

3. The method of claim 2 wherein the determining of the acoustic noise further comprises accumulating multiple measurements of acoustic noise, wherein at least one of the multiple measurements was made prior to receiving the incoming call.

4. The method of claim 1 wherein the assigning of the call agent occurs when the acoustic noise is less than a predetermined threshold.

5. The method of claim 4 wherein the predetermined threshold is based on an attribute of the incoming call.

6. The method of claim 4 wherein the assigning is made using the call agent in the plurality who is associated with the least amount of acoustic noise present.

7. The method of claim 1 wherein the assigning of the call agent occurs when the acoustic noise is greater than a predetermined threshold.

8. The method of claim 7 wherein the predetermined threshold is based on an attribute of the incoming call.

9. The method of claim 1 wherein the plurality of call agents further comprises one or more call agents who are unavailable at the time of the identifying but who are associated with favorable levels of acoustic noise.

10. A method comprising:
    receiving an incoming call at a data-processing system;
    identifying i) that at most one call agent is presently available to handle the incoming call, and ii) at least one call agent who will become available to handle the incoming call within a predetermined time interval;
    determining the acoustic noise that is present in the vicinity of a call agent, for each of the call agents in a plurality that comprises i) the at most one call agent available and ii) the at least one call agent to become available by inferring a level of acoustic noise from a location distance of each available call agent relative to other call agents who are presently engaged in calls; and
    assigning a call agent in the plurality to the incoming call, based on the determining of the acoustic noise that is present.

11. The method of claim 10 wherein the determining of the acoustic noise comprises measuring acoustic noise after receiving the incoming call.

12. The method of claim 11 wherein the determining of the acoustic noise comprises accumulating multiple measurements of acoustic noise, wherein at least one of the multiple measurements was made prior to receiving the incoming call.

13. The method of claim 10 wherein the assigning of the call agent with respect to the acoustic noise level is also based on an attribute of the incoming call.

14. A method comprising:
    receiving an incoming call at a data-processing system;
    identifying a plurality of call agents who are available to handle the incoming call;
    inferring the level of acoustic noise that is present in the vicinity of each call agent in the plurality, from a location distance of each call agent in the plurality relative to other call agents who are presently engaged in calls; and
    assigning a call agent in the plurality to the incoming call, based on the inferring of the level of acoustic noise.

15. The method of claim 14 wherein the assigning of the call agent occurs when the level of acoustic noise is inferred to be less than a predetermined threshold.

16. The method of claim 15 wherein the assigning is made using the call agent in the plurality who is associated with the lowest level of acoustic noise present.

17. The method of claim 14 wherein the assigning of the call agent occurs when the level of acoustic noise is inferred to be greater than a predetermined threshold.

18. The method of claim 14 wherein the plurality of call agents further comprises one or more call agents who are unavailable at the time of the identifying but who are associated with favorable levels of acoustic noise.

* * * * *

UNITED STATES PATENT AND TRADEMARK OFFICE
CERTIFICATE OF CORRECTION

PATENT NO. : 8,160,234 B2  Page 1 of 1
APPLICATION NO. : 12/115208
DATED : April 17, 2012
INVENTOR(S) : Eric John Diethorn It is certified that error appears in the above-identified patent and that said Letters Patent is hereby corrected as shown below:

In the Claims

At Column 7, Claim 1, line 30, change "the call" to --call agents--.

At Column 7, Claim 2, lines 32-33, change "the acoustic" to --the respective acoustic--.

At Column 7, Claim 3, lines 35-36, change "the acoustic" to --the respective acoustic--.

At Column 7, Claim 7, line 49, change "the acoustic" to --the respective acoustic--.

At Column 7, Claim 9, line 55, change "one or more call agents who are" to --at least on call agent who is--.

At Column 8, Claim 9, line 1, change "who are" to --who is--.

At Column 8, Claim 10, line 9, change "the acoustic" to --an acoustic--.

At Column 8, Claim 10, line 9, change "the vicinity" to --a vicinity--.

At Column 8, Claim 14, line 33, change "the level" to --a level--.

At Column 8, Claim 14, lines 33-34, change "the vicinity" to --a vicinity--.

Signed and Sealed this
Third Day of December, 2013

Margaret A. Focarino
*Commissioner for Patents of the United States Patent and Trademark Office*